E. J. MILES.
ENGINE BEARING BURNING IN AND OIL BURNISHING MACHINE.
APPLICATION FILED SEPT. 24, 1917.
1,274,304.
Patented July 30, 1918.
3 SHEETS—SHEET 1.
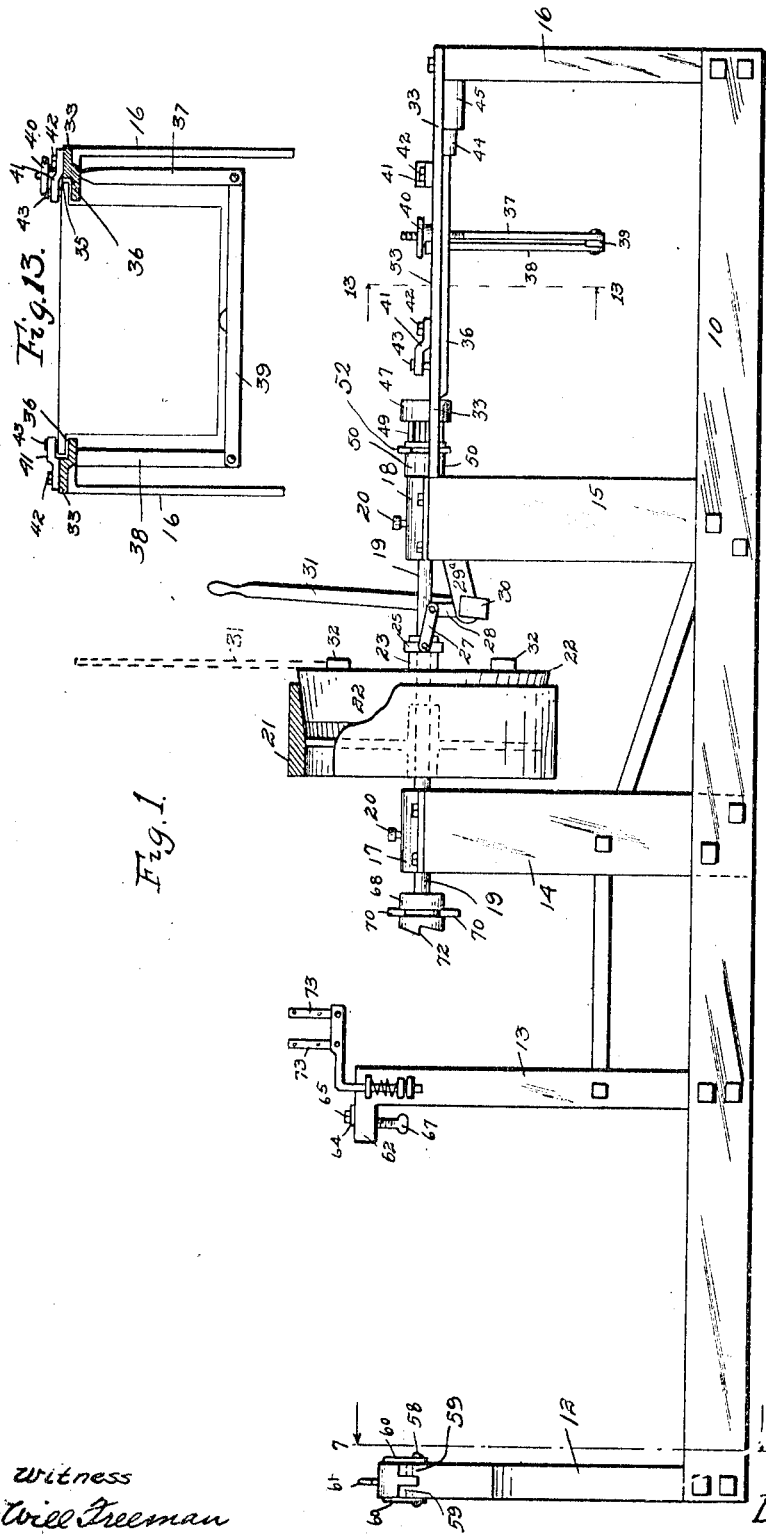
Witness
Will Freeman
Inventor
Edward J. Miles
BY Osurg & Bair
ATTYS E. J. MILES.
ENGINE BEARING BURNING IN AND OIL BURNISHING MACHINE.
APPLICATION FILED SEPT. 24, 1917.
1,274,304.
Patented July 30, 1918.
3 SHEETS—SHEET 2.
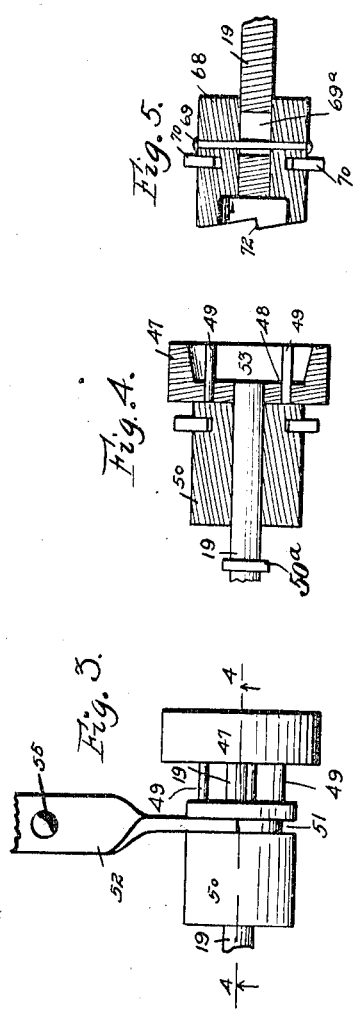
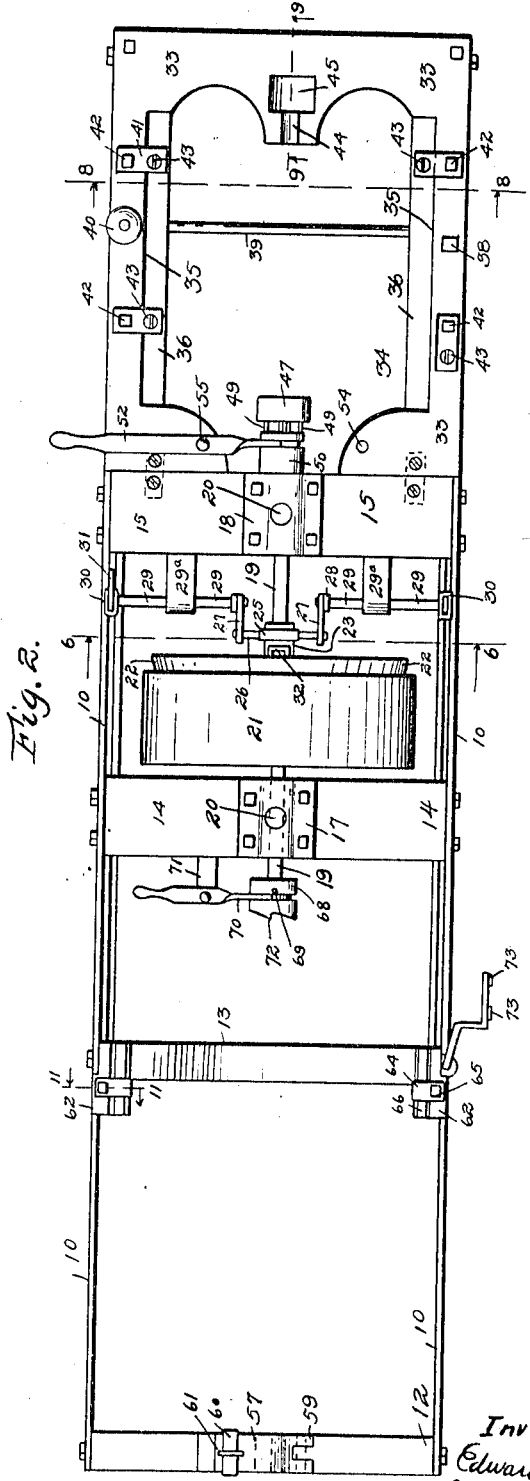
Witness
Will Freeman
Inventor
Edward J. Miles
by Orwig & Bair, attys.

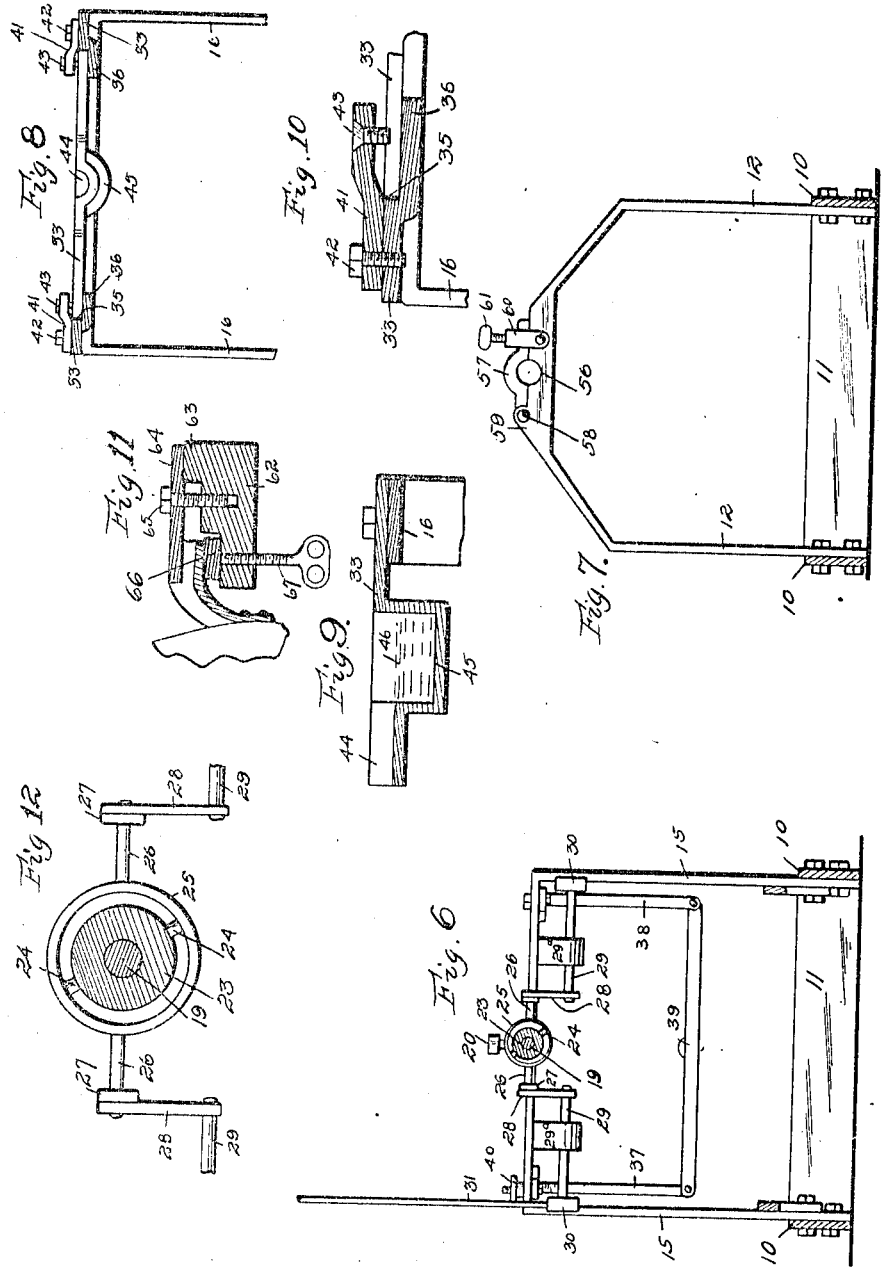

UNITED STATES PATENT OFFICE.

EDWARD J. MILES, OF NEWTON, IOWA.

ENGINE-BEARING BURNING-IN AND OIL-BURNISHING MACHINE.

1,274,304.  Specification of Letters Patent.  Patented July 30, 1918.

Application filed September 24, 1917. Serial No. 193,025.

*To all whom it may concern:*

Be it known that I, EDWARD J. MILES, a citizen of the United States, and resident of Newton, in the county of Jasper and State of Iowa, have invented a certain new and useful Engine-Bearing Burning-In and Oil-Burnishing Machine, of which the following is a specification.

The object of my invention is to provide an engine bearing burning in and oil burnishing machine of simple, durable and inexpensive construction.

A further object of my invention is to provide a machine adapted to receive and operate upon the various parts of an automobile engine whereby the bearings may be properly smoothed and alined, so that the crank shaft of the engine may be properly journaled.

A further object of my invention is to provide a machine, which is adapted to receive the block of an engine and to provide means for revolving the crank shaft, which has been journaled into the roughly finished bearings of the block, so that the bearings may be burned in.

A further object of my invention is to provide a machine embodying in one framework a shaft whereby the crank shaft of the engine may be rotated during either the oil burnishing process or during the burning-in process and which is also capable of supporting the engine, so that it may be driven under its own power independent of the power of the exterior source of power.

A further object of my invention is to provide an improved means whereby the engine block during the burning in process and the engine including the transmission during the oil burnishing process may be supported and alined with the power shaft in my machine, so that power may be secured from said shaft for either of the processes.

A further object of my invention is to provide an improved clutch device whereby the power shaft may be operatively connected with the forward half of the universal joint of the automobile transmission during the oil burnishing process whereby power may be applied to the crank shaft from the power shaft when it is desired to rotate the former from the latter but which will automatically become disengaged when it is desired to operate the engine under its own power.

A further object of my invention is to provide a combined means whereby the power shaft may be operatively connected with any suitable source of power and which is also so arranged that the power shaft may be rotated for any desired number of turns by hand for testing purposes, the latter means being so devised that the power shaft may not be rotated by hand without first disconnecting the power shaft from the source of power nor could the power shaft be connected with the source of power unless the hand operating means is first removed to position where it cannot cause injury from the rapid rotation caused by the source of power.

A further object of my invention is to provide a cradle adapted to receive the engine block during the burning in process, which is capable of vertical adjustment and to provide adjustable stops whereby the upward movement of the block may be limited, so that the block may be rigidly clamped in position where the crank shaft is alined with the power shaft.

A further object of my invention is to provide an improved bearing burner whereby the engine block may be readily attached to or detached from the frame of the machine during the burning in process, and to provide means whereby the crank shaft while attached to the engine block may be accurately alined with the power shaft of the machine and whereby the engine block may be properly and accurately adjusted with relation to the crank shaft.

A further object of my invention is to provide in such a machine means for oil finishing or burnishing the bearings after the burning in process including means for properly alining the engine shaft with the power shaft of the machine, means for properly adjusting the engine block and means for connecting the power shaft with the engine shaft in the assembled engine, including a clutch device adapted to engage the forward half of the universal joint of the engine transmission, which is so arranged that moving the power shaft a quarter of a turn will permit the operator to determine if the crank is intermediate with the power shaft by intercepting the connection between the clutch member and the universal joint member before and after a quarter of a turn has been made.

With these and other objects in view, my invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of a machine embodying my invention.

Fig. 2 shows a top or plan view of the machine shown in Fig. 1.

Fig. 3 shows an enlarged side elevation of the clutch device used in connection with the burning in process.

Fig. 4 shows a sectional view taken on the line 4—4 of Fig. 3.

Fig. 5 shows a vertical, sectional view through the clutch device used to connect the power shaft with the universal member of the engine during the oil burnishing process.

Fig. 6 shows a vertical, sectional view taken on the line 6—6 of Fig. 2.

Fig. 7 is a vertical, sectional view taken on the line 7—7 of Fig. 1.

Fig. 8 shows a vertical, sectional view having parts broken away taken on the line 8—8 of Fig. 2.

Fig. 9 shows a vertical, sectional view taken on the line 9—9 of Fig. 2.

Fig. 10 shows a vertical, sectional view illustrating the device whereby the engine block is clamped in place during the burning in process.

Fig. 11 shows an enlarged vertical, sectional view taken on the line 11—11 of Fig. 2 showing the portion of crank casing and engine supporting bracket, the latter being shown in section to illustrate the manner in which it is supported to the clamping devices.

Fig. 12 shows an enlarged vertical, sectional view of the clutch controlling device whereby the power shaft is operatively connected with the outside source of power, and Fig. 13 shows a vertical, sectional view taken on the line 13—13 of Fig. 1 having shown therein in light lines the outline of the engine block whereby the use of my improved device for holding the engine properly alined is illustrated.

Referring to the accompanying drawings, I have used the reference numeral 10 to indicate generally a pair of longitudinal frame and base members extending therebetween. Fixed to and extending upwardly from the members 10 are supporting members 12, 13, 14, 15 and 16, which are spaced from each other and support various portions of the device, which will be hereinafter described.

The supports 14 and 15 are provided at their upper central portions with alined bearing members 17 and 18 in which is journaled a shaft 19. Suitable grease cups or the like 20 are provided to lubricate the bearings 17 and 18. Rotatably but non-slidably mounted on the shaft 19 is a pulley 21, which has the inner surface of its periphery at one side beveled to form one member of a cone clutch. Slidably but non-rotatably mounted on the shaft 19 is a second cone clutch member 22 adapted to be received within the cone shaped recess of the pulley 21 whereby the pulley 21 may be operatively connected with the shaft 19. The clutch member 22 is provided with a laterally extending collar 23 having an annular groove (not shown) therein adapted to receive a pair of pins 24, which project inwardly from an annular collar 25. The collar 25 is also provided with a pair of opposite outwardly extending lugs 26, which are journaled in the ends of the links 27. The free ends of the links 27 are pivoted to the ends of the second pair of links 28, the latter links having their lower ends fixed to the ends of a pair of alined shafts 29, which are secured in bearings formed in brackets 29ª, which project from the support 15. At the outer ends of the shafts 29 suitable sockets 30 are provided, which are adapted to receive the lever 31 whereby the shafts 29 may be rotated.

It will be seen from the foregoing that rotation of the shafts 29 by means of the lever 31 will swing the links 28 whereby the links 27 will be moved longitudinally of the machine, which will in turn move the collar 23 longitudinally through the coöperation of the lugs 24 and 26 and the ring 25. It will thus be seen that movement of the lever 31 may either throw the clutch members comprising the inside of the pulley 21 and the member 22 into or out of engagement whereby rotation of the pulley 21 may impart rotation to the power shaft 19. A plurality of sockets 32 are secured to the back of the clutch member 22, which are adapted to receive the end of the lever 31 whereby the clutch member 22 and the shaft 19 may be rotated by hand. It will be seen that by this arrangement it is necessary to attach the clutch control lever in order to move the shaft 19 by hand and detach the hand operating lever in order to throw in the clutch member controlling the shaft 19. It is, therefore, very unlikely that the clutch members will accidentally be thrown into engagement when the hand operating means is being used, so that the probabilities of injury to a workman is substantially eliminated.

The supports 15 and 16 are designed to secure a plate 33, which forms a clamping table adapted to accurately hold the block of the engine against movement when the burning in process is taking place. The plate 33 is formed with a central opening 34 of such general dimensions as to permit the engine block to be inserted therein and of such width that shoulders formed at the side edges of the opening will catch the flanges on the engine block to prevent the block from passing through the opening and to provide means for clamping the block in place.

The construction of the parts, which are to coöperate with the plate 33 to receive the lower flange on the engine block, is illustrated in Fig. 10, which shows the shoulder 35 at the lower edge of which is a laterally extending rest 36 upon which the flange of the engine block rests when the block is first set into the opening 35. A pair of rods 37 and 38 are secured into either side of the plate 33 near the center thereof and extend downwardly therefrom. A cross bar 39 is pivoted to the lower ends of the rods 37 and 38. The rod 37 is secured to the machine at its upper end and provided with a thumbnut 40 whereby the rod 37 may be vertically adjusted. Two or more stops or turn buttons 41 are secured to either side of the plate 33, so that in one position of the movement of the buttons 41 their ends will project over the rests 36. A screw or the like 42 is provided as a pivot for the turn buttons 41 and a set screw 43 is screw threaded into and projects through the end of the turn button 41, which is adapted to project over the rests 36.

From the description of the foregoing parts, it will be seen that when the engine block is inserted through the opening in the plate 33, the flanges thereof will rest on the rests 36 while the top of the engine block will rest adjacent to the rod 39. The turn buttons or clamping devices 41 are, of course, turned to one side when the engine block is inserted into the opening in the plate 33 and when the block has been inserted these clamping devices are then turned back so their ends project over above the edges of the flanges of the engine block. If the screws 43 in the clamping devices 41 are turned until their lower ends touch the flanges of the engine block and then the thumbnut 40 is turned to raise the rod 39, it will be seen that the coöperation of the upward pressure of the rod 39 with the resistance of the ends of the screws 43 will form a rigid clamping device to hold the engine block from movement.

The plate 33 is also provided with a half bearing member illustrated in Figs. 2, 8 and 9 in cross section, which comprises a trough or channel 44 adapted to receive the forward or crank end of the engine shaft when the latter is first set into the machine while the trough 45 is of greater depth than the trough 44 and may receive the fan belt pulley or starter pinion. The end of the shaft 19 adjacent to the plate 33 has a disk 47 secured thereto, which has a recess 53 in its face of the shape of a truncated cone with a base of the cone flush with the surface of the disk 47 and is provided with a plurality of openings 48 adapted to slidably receive a plurality of pins 49. The pins 49 are mounted on the end of the collar 50, which is loosely mounted on the shaft 19 between the bearing 20 and the member 47. The collar 50 is provided with an annular groove 51, which receives the forks of a forked lever 52, which is adapted to reciprocate the collar 50 longitudinally of the shaft 19.

It will be understood that the crank shaft of an automobile engine is provided with an annular flange at the rear end, which has a plurality of openings therein whereby the plate may be bolted to the balance wheel of the automobile and the recessed member 47 is designed to have this plate received in the recessed face thereof while the pins 49 are designed to be received in the bolt holes of the flange at the end of the crank shaft. The shaft 19 imparts rotation to the crank shaft while the pins 49 are received in said openings in said plate. Suitable means such as the collar 50$^a$ are arranged to limit the reciprocation of the collar 50 on the shaft 19, so that the pins 49 will not slide completely out of the openings in the cup shaped members and will only slide through the openings a distance sufficient to enable their outer ends to project through the openings in the crank shaft flange. The pins 49 are somewhat smaller than the openings provided in the plate on the crank shaft, so that if it should happen that the crank shaft is not properly alined with the shaft 19 then cam movement of the plate at the end of the crank shaft will gradually force the pins 49 out of the cupped portion of the member 47 and out of the openings in said plate whereby the crank shaft will be disconnected from the power shaft 19, so that no injury will be done to the bearings of the engine block or to the connections of the shaft 19.

The practical operation of the parts previously described is as follows: When it is desired to burn in the bearings of the block, the block is turned upside down and its top placed on the cross bar 39 or its flanges resting on the rests 36. The crank shaft is then placed with its forward or crank end in the trough or bearing 44 and the plate end within the recess 53 and the lever 52 operated to throw the pins 49 through the openings in the plate at the end of the crank shaft. When the flange at the end of the crank shaft is forced into the recess 53, it will be seen that the inclined sides thereof will automatically aline the crank shaft with the shaft 19. It may be noted in this connection that openings 54 are provided at either side of the plate 33 wherein the pivot or pin 55 of the lever 52 may be received, so that this lever may be installed upon either side of the machine depending upon whether the operator is right or left handed.

As the pins 49 and the cup shaped member 47 together with the bearing 44 are arranged so that the crank shaft received therein must be in exact alinement with the shaft 19, it will be seen that the crank shaft of the engine will now be in alinement with the shaft 19. It is, however, desirable that the block of the engine should be clamped in place, so that it will be held from movement and its bearings so disposed that they will not put an undue pressure on the crank shaft in any direction whereby the bearings might become unevenly fitted. It will also be seen that if the engine block were permitted to move longitudinally of the frame, the flange on the crank shaft would become disengaged from the recess 53, so that the crank shaft would move from alinement with the shaft 19. For this reason the block must be so clamped that the center of the bearing will be exactly alined with the axis of the shaft 19. As the crank shaft of the engine is already alined with the shaft 19, it is only necessary to clamp the engine block in place, so that it cannot move in order to secure the proper alinement of its bearing.

When the crank shaft has been alined with the shaft 19 the screws 43 in the clamping devices 41 are turned until their ends rest against the flanges of the engine block. The thumbnut 40 is then turned until the rod 39 bears against the engine block whereby the weight of the engine block will be taken off from the crank shaft and the block will be clamped in place and held from movement either longitudinally or around the crank shaft. It will be seen that even though the engine block should be somewhat rotated upon the crank shaft as an axis the tightening of the thumbnut 40 will bring the flanges of the block tightly against the lower ends of the screws 43 whereby the forward end of the crank will be lifted with the bearing 44. This result does not substantially affect the alinement of the crank shaft with the shaft 19 but does insure that the crank shaft will be properly journaled in the engine block during the burning in process. By this arrangement, it will be seen that if the bearings in the block have become somewhat worn so that they do not have the same alinement relative to the block that they had when they left the factory, the block may positively be clamped in position where the bearings therein are properly alined with the shaft 19.

The end of the machine consisting of the portion between the supports 14 and 12 is designed to permit the oil burnishing process to be accomplished. It has been found desirable when the oil burnishing process is to be performed to assemble the engine and transmission together, so that they may be run together by an outside power to "work in" the bearings. I have, therefore, devised means whereby the assembled engine including the transmission may be supported and the power from my pulley wheel transmitted to the engine shaft by means of the transmission, which is also adapted to permit the engine to be run under its own power for the final test of the bearings. To accomplish this result, I have found it desirable to connect my shaft 19 with the forward half of the universal joint of the automobile engine as several advantageous results are thereby secured. In order to support the forward or crank end of the crank shaft in alinement with the shaft 19 during the oil burnishing process I provide a clamp member comprising a semi-circular transverse groove 56 at the upper central portion of the support 12 and the hinged clamp member 57, which is pivoted by pins 58 to ears 59 formed integral with the support 12. A U-shaped yoke 60 has its ends pivoted to the support 12 in such position that the central portion of the yoke may swing over the free end of the clamp member 57 and the set screw 61 is provided whereby the clamp member 57 may be held from pivotal movement after the front engine support has been inserted in between the clamp members 56 and 57.

When the engine of an automobile is assembled, the lower portion of the crank casing is provided with two outwardly extending ears, which are normally adapted to rest upon and be bolted to the longitudinal frame members of the automobile. I have provided the support 13 upon which these projecting ears of the engine are adapted to rest and to be clamped in place. At each upper corner of the support 13 a device such as illustrated in Fig. 11 is provided wherein these beforementioned upwardly extending ears are received. This consists of a rest 62. The rest 62 is provided with an upstanding rib 63 upon which the rear end of the turn button 64 is supported while the bolt 65 permits the turn button 64 to be rotated and its free or inside end to be clamped down against any object beneath it.

In order to secure a vertical adjustment of the portion upon which the beforementioned ears rest, I have provided a movable plate 66 in which the upper end of a bolt 67 is rotatably mounted whereby rotation of the threaded bolt 67 in the rest 62 raises or lowers the plate 66 whereby the ears on the engine may be vertically adjusted. The end of the shaft 19 adjacent to the last described parts is provided with a clutch member, which is more specifically illustrated in Fig. 5 and consists of a collar 68, which is slidably but non-rotatably mounted upon the shaft 19 by means of the pins 69 and slot 69ª. A forked lever 70 is pivoted to the bracket 71, which extends from the support 14 and has its forked ends received within an annular groove in the collar 68 whereby the collar 68 may be reciprocated relative to the shaft 19. The face of the collar 68 has teeth formed therein whereby it is adapted to coact with the forward half of the universal joint of the transmission shaft to drive the transmission shaft in one direction.

It will be seen that the oneway clutch member provided permits the transmission shaft to be driven from the pulley 21 when it is so desired or the engine may be driven under its own power and the shape of the teeth 72 is such that the collar 68 will be moved to throw the teeth out of engagement when the speed of the engine becomes greater than that of the shaft 19. A further advantage resides in the use of the two tooth oneway clutch members herein shown in that if the engine and transmission be installed on the rests 62 with the front engine support in the clamp members 56 and 57, the forward half of the universal joint will then rest against the teeth of the member 68. If the shaft 19 be revolved by hand so that the two teeth 72 are in a vertical position, it may be determined at a glance whether the transmission shaft of the engine is alined horizontally with the shaft 19 because if the transmission shaft is not alined with the shaft the upper surface of the universal joint member will not flush with the upper surface of the clutch member.

By means of the plate 66 and the screw 67 the ears on the engine may be vertically adjusted until the transmission shaft is horizontally alined with the shaft 19, which happens whenever the universal joint reaches the bottom of both notches adjacent to the teeth 72. If now the shaft 19 be rotated a quarter of a turn in any convenient manner the lateral alinement of the crank shaft with the shaft 19 will be automatically secured.

In the practical operation of the parts of my device, which have just been described, the engine is completely assembled into the transmission to and including the forward half of the universal joint. The crank or forward end of the engine shaft is then inserted in the support 12 and the rear ends of the engine shaft terminating in the half of the universal clutch joint is connected with the clutch 68 and the engine shaft suitably alined by the means heretofore described.

The lever 31 is then operated to engage the clutch member 22 whereby rotation will be imparted from the pulley 21 to the shaft 19 and from there to the engine shaft. The engine shaft may then be rotated for any desired length of time, which is determined by the manner in which the engine operates when it is driven under its own power. It has been found desirable to continue this rotation of the engine shaft while the bearings are properly lubricated for a considerable time in order to further smooth and burnish the Babbitt metal. When this smooth or oil burnishing process has been completed, the coils of the engine may be clamped to the bracket 73 and the carbureter connected to any suitable supply of gasolene. It should be mentioned in this connection that when new babbitting has been installed in an engine or the old bearings refitted, the engine very often is what is termed "stiff" so that it is extremely hard to start it and when it is being run some power is lost as the bearings and other parts are still tight so that it has been found extremely advantageous to test the engine by running it under its own power before it is installed in the frame of the automobile.

By my improved device I am able by a single machine and from a single source of power to do the finishing of the Babbitt bearings in a facile and economical manner. It will be noted that for both processes fitting means have been provided for alining the shaft of the engine with the power shaft in my machine whereby the accuracy of the bearings may not be endangered. In the case of the burning in of the bearings my clutch device is so arranged that if it should happen that the bearings are not properly alined with the power shaft the clutch device will automatically disengage itself, so that injury may not be done to either the parts of the engine or my machine. A similar result also occurs if it happens that the assembled engine is not properly placed on the supports or rests 62 as the one way clutch member 68 will almost instantly be moved away from the forward half of the universal joint in case the engine shaft is not alined with the shaft 19.

It will be understood that my machine is very desirable as it permits the engine to be operated by its own power without making it necessary to place the engine in the chassis of the car for the power test. The importance of this feature may readily be appreciated when it is considered that it requires a considerable amount of time to install the engine in the chassis so that if the engine does not then work properly it is necessary to take it out of the chassis and again place it in the burning in machine.

In this case it may be explained further that the burning in and oil burnishing process in connection with these bearings is used whether new or old babbitt is used with the bearings whenever it is necessary to take an engine to pieces. Before the burning in process is started the bearing is so shaped that babbitt may be clamped very tightly about the shaft by means of the removable parts of the bearing. The burning in and oil burnishing process in reality consists of melting the babbitt adjacent to the crank shaft until an opening of just proper size is left for the shaft so that if these processes have not been completed properly the babbitt still very closely grips the engine shaft and a large amount of power is lost if it is possible to run the engine at all.

As there are no means of testing the state of the babbitt by instruments in the present state of the art, the only real test of the completeness of the burning in and oil burnishing processes resides in running the engine under its own power.

It will be seen from the description of my machine and its operation that the oil burnishing process may be alternated with the tests of the engine when it is run under its own power until the running of the engine shows the operator that the oil burnishing process has been properly accomplished. It should be noted that my machine may be used where the old babbitt in the bearings is left in as well as where the old babbitt has been reamed out and new babbitt poured in.

I claim as my invention:

1. In a device of the class described, a frame, a shaft journaled therein intermediate of the ends of the frame, a pulley wheel journaled to the shaft, means for operatively connecting and for disconnecting the pulley wheel from the shaft, a support at either end of the frame, a journal mounted in each of said supports, the axes of said journals being alined with the axis of said shaft, and a clutch member secured to either end of said shaft.

2. In a device of the class described, a frame, a shaft journaled intermediate of the ends of the frame, means for operatively connecting the crank shaft of an automobile engine with one end of said shaft, means adapted to receive and hold the block of an automobile engine in position where the crank shaft may be alined with said shaft, a support mounted adjacent to one end of the frame, means for securing the supporting ears of an automobile engine to said support in such position that the crank shaft of the engine may be alined with said shaft, and means for operatively connecting the second end of said shaft with the crank shaft of an automobile engine, which is supported by said support.

3. In a device of the class described, a support, a shaft journaled therein, a source of power, means for operatively connecting said source of power with and for disconnecting said source of power from said shaft, a cup shaped member secured to the free end of said shaft and having a plurality of openings therethrough, a collar slidably mounted on said shaft adjacent to the cup shaped member, a plurality of pins fixed to said collar and adapted to be received in the openings of said cup shaped member, means for moving said collar longitudinally of the shaft, and means for clamping the block of an automobile engine in position where the crank shaft may be alined with said shaft and having its rear end received in said cup shaped member whereby power may be imparted from said shaft to the crank shaft of an automobile engine to burn the bearings in the block and whereby the shaft may be automatically disconnected from said engine shaft, if the latter is not in alinement with the first described shaft.

4. In a device of the class described, a frame, a pair of supports mounted thereon, a plate mounted on said supports, a cradle secured to said plate, a plurality of turn buttons mounted on said plate, a power shaft mounted in one of said supports, a clutch device secured to said power shaft adjacent to said plate, and means for controlling said clutch device, the parts being so arranged that the block of an automobile engine may be received within said plate upon said cradle and clamped from movement by means of said cradle and turn buttons, so that the crank shaft of the engine block may be held in alinement with the power shaft.

5. In a device of the class described, a support for an automobile engine block, a power shaft mounted adjacent to said support, means for operatively connecting said power shaft with a shaft in said engine block, and means for adjusting said support whereby the engine shaft may be alined with said power shaft.

6. In a device of the class described, a support adapted to receive and support an automobile engine, a transmission, a power shaft mounted adjacent to said support, a clutch means for operatively connecting said power shaft with the engine shaft of said engine, means for adjusting said support whereby the engine shaft may be alined with said power shaft, and means for automatically disconnecting said clutch when the speed of the engine shaft becomes greater than the speed of the power shaft.

7. In a device of the class described, a frame, a support thereon, a supporting means, a power shaft journaled in said supporting means, a bearing member in said first support adapted to receive the forward end of the engine, means for quickly detaching the upper half of said bearing member whereby said engine may be readily removed, a one way clutch member secured to the end of said power shaft, intermediate supports and an adjustable means for clamping the engine and transmission to the intermediate supports whereby the shaft of the engine may be alined with said power shaft.

8. In a device of the class described, a supporting frame, means thereon for supporting an automobile engine, a power shaft mounted on said frame, means for operatively connecting the engine shaft with the power shaft, means whereby the engine shaft may be alined with the power shaft, a clutch member fixed on said power shaft, a clutch member loosely mounted on said power shaft, a gearing device operatively connected with said last described clutch member, said first clutch member having means whereby said first clutch member may be manually rotated for rotating the power shaft for testing purposes.

9. In a device of the class described, a frame, a shaft journaled therein intermediate of the ends of the frame, a pulley wheel journaled to the shaft, means for operatively connecting and for disconnecting the pulley wheel from the shaft, a support at either end of the frame, a journal mounted in each of said supports, the axes of said journals being alined with the axis of said shaft, a clutch member secured to either end of said shaft, and means between one of said journals and said shaft for supporting an engine block with the shaft therein and for adjusting said block to position with the engine shaft alined with the power shaft.

10. In a device of the class described, a frame, a shaft journaled therein intermediate of the ends of the frame, a pulley wheel journaled on the shaft, means for operatively connecting and for disconnecting the pulley wheel from the shaft, a support at either end of the frame, a journal mounted in each of said supports, the axes of said journals being alined with the axis of said shaft, a clutch member secured to either end of said shaft, means between one of said journals and said shaft for supporting an engine block with the shaft therein and for adjusting said block for alining said engine shaft with the power shaft, and a means between the other journal and said power shaft for supporting an engine block with an engine shaft therein assembled complete with a transmission and for adjusting said block for alining the last described engine shaft with said power shaft.

11. In a device of the class described, a frame, a power shaft mounted thereon, means for transmitting motion to said power shaft, said means including a clutch device, a journal mounted on said frame spaced from said power shaft, and having its axis alined with the axis of the power shaft, means for supporting one end of an engine shaft in alinement with said first shaft when the other end of the engine shaft is supported in said journal, and adjustable means for supporting an engine block intermediate of said journal and said power shaft with the engine shaft properly received in said block.

12. In a device of the class described, a frame, a power shaft mounted thereon, means for transmitting motion to said power shaft, said means including a clutch device, and a means including adjustable members, for supporting an engine block with a shaft therein in position for holding said latter shaft in alinement with said power shaft.

13. In a device of the class described, a frame, a power shaft mounted thereon, means for transmitting rotation to said power shaft, said means including a clutch device, and means on said frame for adjusting an engine block for alining a shaft therein with said power shaft, said frame being so shaped that when a block is supported thereon access may be had to the block from above or below the supporting portions of the frame, for the removal of the pistons.

Des Moines, Iowa, August 22, 1917.

EDWARD J. MILES.